United States Patent
Weigand

(10) Patent No.: US 6,850,617 B1
(45) Date of Patent: Feb. 1, 2005

(54) TELEPHONE RECEIVER CIRCUIT WITH DYNAMIC SIDETONE SIGNAL GENERATOR CONTROLLED BY VOICE ACTIVITY DETECTION

(75) Inventor: David Lind Weigand, Santa Clara, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 09/481,925

(22) Filed: Jan. 12, 2000

Related U.S. Application Data

(60) Provisional application No. 60/172,546, filed on Dec. 17, 1999.

(51) Int. Cl.[7] .............................. H04M 9/00; H04M 3/00
(52) U.S. Cl. .................. 379/391; 379/392; 379/392.01; 379/418
(58) Field of Search ............................ 379/391–392.01; 455/570, 569.1

(56) References Cited

U.S. PATENT DOCUMENTS

| | | | | |
|---|---|---|---|---|
| 5,893,034 A | * | 4/1999 | Hikuma et al. | ............. 455/501 |
| 5,946,391 A | * | 8/1999 | Dragwidge et al. | ......... 379/391 |
| 6,041,118 A | * | 3/2000 | Michel et al. | ............... 379/391 |

* cited by examiner

*Primary Examiner*—Forester W. Isen
*Assistant Examiner*—Ramnandan Singh
(74) *Attorney, Agent, or Firm*—Vedder Price Kaufman & Kammholz, P.C.

(57) ABSTRACT

A telephone receiver circuit with sidetone signal generation controlled by voice activity detection in accordance with the present invention uses the voice activity detector (VAD) to detect the presence of voice activity within the microphone signal and dynamically adjust the sidetone signal generation to compensate for noisy environments by eliminating or reducing the sidetone signal in the absence of voice activity. Hence, a sidetone signal is generated in the presence of voice activity, when feedback is required, while the sidetone signal is not generated in the absence of voice activity, since audio feedback for the user is not required then.

7 Claims, 1 Drawing Sheet

TELEPHONE RECEIVER CIRCUIT WITH DYNAMIC SIDETONE SIGNAL GENERATOR CONTROLLED BY VOICE ACTIVITY DETECTION

RELATED APPLICATION

This application claims the benefit of and incorporates herein by reference U.S. provisional patent application No. 60/172,546, filed Dec. 17, 1999, and entitled "Telephone Receiver Circuit With Sidetone Signal Generator Controlled By Voice Activity Detection."

BACKGROUND OF THE INVENTION

1. Field of the Invention

The present invention relates to telephone receiver circuits, and in particular, to telephone receiver circuits providing sidetone signal generation for feedback during voice transmission.

2. Description of the Related Art

Telephonic communication within a noisy background environment can be quite difficult due to the background noise. This problem is worsened by the background noise picked up by the microphone and fed back to the speaker by way of a sidetone signal, thereby causing the background noise to be mixed with the received audio signal and received at both ears of the user. While audio feedback via the sidetone signal is very important in helping the user talk in a normal manner on the telephone handset, it is nonetheless troublesome when trying to communicate with a high level of background noise.

Referring to FIG. 1, a basic telephone transceiver system 10 incorporates the following basic functional elements: transmitter circuitry 20; a voice activity detector (VAD) 22; a sidetone signal generator 24; receiver circuitry 26; a signal duplexor 28; a signal combiner 30; an antenna 32; a microphone 34; and a speaker 36; all interconnected substantially as shown. As discussed further below, a second microphone 38 may also be included.

In accordance with well known principles, the system operates as follows. During signal reception, an incoming high frequency (e.g., radio frequency) wireless signal 11 is received by the antenna 32 and converted to a corresponding high frequency electrical signal 33. The signal duplexor 28 routes the incoming signal 29 to the receiver circuitry 26 for processing in accordance with well known principles (e.g., frequency down-conversion, filtering and demodulation). The resulting audio signal 27 is combined with a sidetone signal 25 in a signal combiner 30 (e.g., a signal summing circuit), and the resulting audio signal 31 is provided to the speaker 36 which converts it to the corresponding sound 37. (During signal reception, the sidetone signal 25 is substantially inactive or of zero magnitude.)

During signal transmission, incoming sound 15 generated by the voice of the user is picked up by the microphone and converted to an audio signal 35 which is distributed to the transmitter circuitry 20, VAD 22 and sidetone generator 24. This audio signal 35 is processed by the transmitter circuitry 20 in accordance with well known principles (e.g., modulated onto a higher frequency signal, frequency up-converted and filtered) to produce a high frequency signal 21 for transmission. The signal duplexor 28 routes this signal 21 to the antenna 32 for transmission as a high frequency (e.g., radio frequency) wireless signal 13.

The VAD 22 monitors the incoming audio signal 35 for voice activity and provides a control signal 23 to the transmitter circuitry 20 for performing voice-operated transmission (VOX). During VOX operation, the presence of voice activity within the incoming audio signal 35 causes the VAD 22 to provide the control signal 23 in such a manner that the transmitter circuitry 20 is enabled (or otherwise controlled) to provide the high frequency output signal 21 for transmission. In the absence of voice activity within the audio signal 35, the VAD control signal 23 causes the transmitter circuitry 20 to be disabled inasmuch as at least the power amplifier for the output signal 21 is disabled or turned off. This allows electrical power to be conserved, which is particularly important with the system 10 is being powered by a portable battery.

Also during signal transmission, the audio signal 35 is processed by the sidetone generator 24 (e.g., attenuated) to produce a sidetone signal 25 which is provided as one of the signal components in the speaker signal 31 for conversion to feedback sound 37 for the user, as discussed above.

However, as noted above, this feedback sound 37, when it contains background noise, can pose problems for the user when trying to communicate in a noisy environment. One conventional technique which has been used to address this problem is to use a second microphone 38 which picks up the background noise 17 and converts it to a "noise" audio signal 39 which is processed within the sidetone generator 24 to determine what level of sidetone signal 25 should be provided for conveyance to the speaker 36. For example, when the background noise 17 is sufficiently high, the "noise" signal 39 will be above a predetermined threshold which causes the sidetone generator 24 to either disable the sidetone signal 25 or set it at some minimum magnitude.

While this technique can be somewhat effective, it requires the use of a second microphone 38 and, therefore, results in a higher-cost system 10. Additionally, the nature of the background noise 17 can make it problematic in establishing a reliable threshold within the sidetone generator 24 for determining when the audio sidetone signal 25 should be provided. Even if the second microphone 38 is avoided and the primary incoming audio signal 35 is used for tracking the background noise, the problem of establishing the appropriate threshold, as noted, still remains.

SUMMARY OF THE INVENTION

A telephone receiver circuit with sidetone signal generation controlled by voice activity detection in accordance with the present invention uses the voice activity detector (VAD) to detect the presence of voice activity within the microphone signal and dynamically adjust the sidetone signal generation to compensate for noisy environments by eliminating or reducing the sidetone signal in the absence of voice activity. Hence, a sidetone signal is generated in the presence of voice activity, when feedback is required, while the sidetone signal is not generated in the absence of voice activity, since audio feedback for the user is not required then.

A telephone receiver circuit with a sidetone signal generator controlled by voice activity detection in accordance with one embodiment of the present invention includes a voice activity detection circuit, a sidetone signal generator circuit and a signal combining circuit. The voice activity detection circuit is configured to receive a first transmitter audio signal originating from a transmitter audio signal source and to detect voice activity within the first transmitter audio signal and in accordance therewith provide a voice activity detection signal that indicates when the first transmitter audio signal voice activity has transcended a voice activity threshold. The sidetone signal generator circuit, coupled to the voice activity detection circuit, is configured to receive the voice activity detection signal and a second transmitter audio signal which is related to the first transmitter audio signal and in accordance therewith provide a sidetone signal with first and second magnitudes when the voice activity detection signal indicates that the first transmitter audio signal voice activity has transcended the voice activity threshold in first and second directions, respectively. The signal combining circuit, coupled to the sidetone signal generator circuit, is configured to receive and combine the sidetone signal and a first receiver audio signal originating from a receiver audio signal source and in accordance therewith provide a second receiver audio signal containing an audio signal component which is related to the sidetone signal.

These and other features and advantages of the present invention will be understood upon consideration of the following detailed description of the invention and the accompanying drawings.

DETAILED DESCRIPTION OF THE INVENTION

Figure 1:
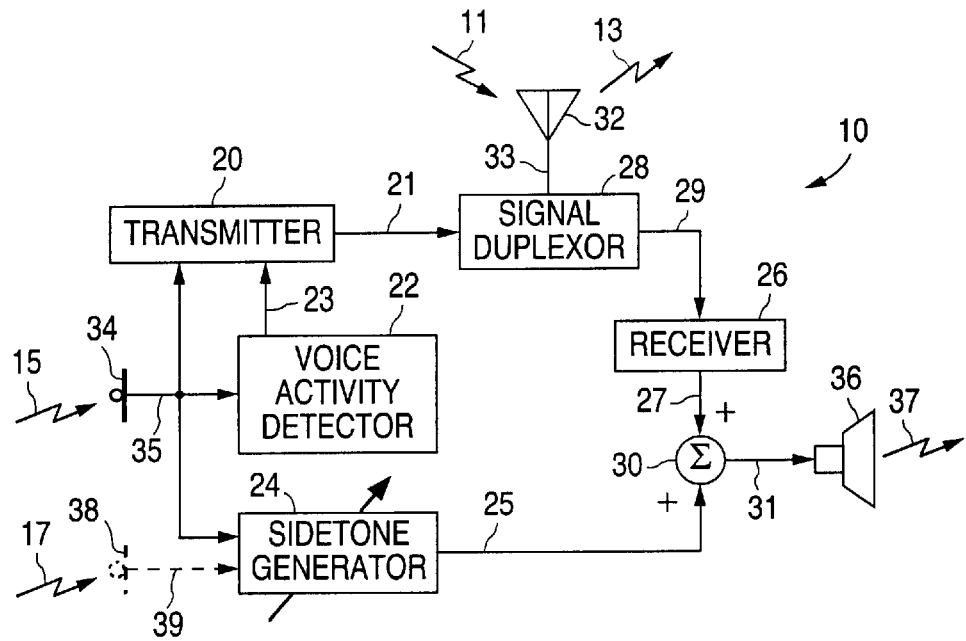
FIG. 1 is a functional block diagram of a conventional telephone transceiver system.
Figure 2:
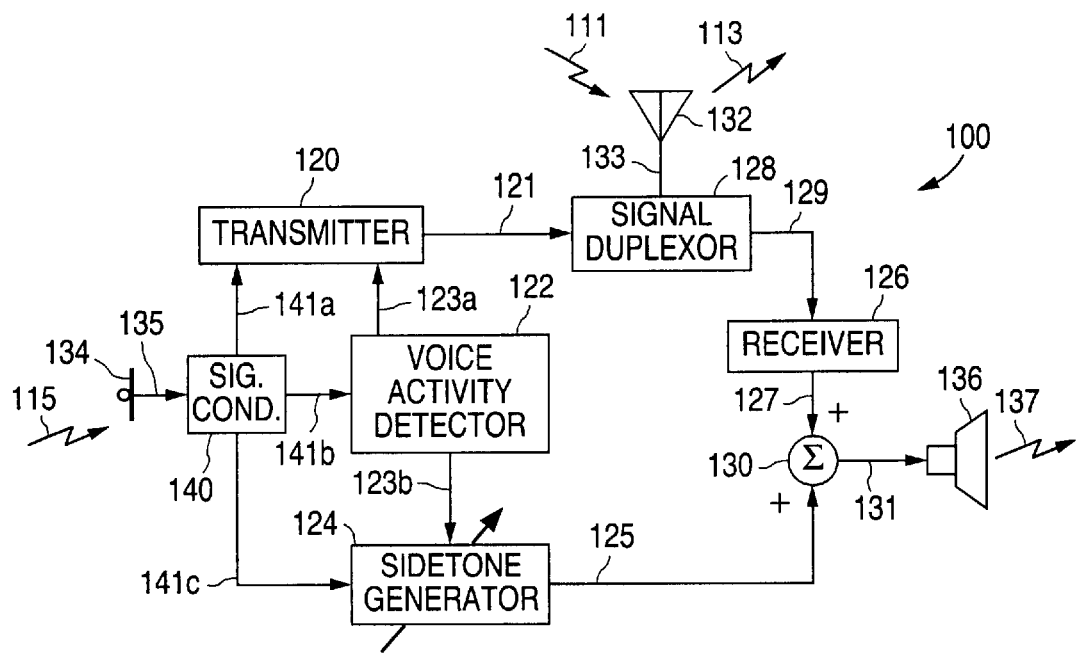
FIG. 2 is a functional block diagram of a telephone transceiver system containing a receiver circuit in accordance with one embodiment of the presently claimed invention

Referring to FIG. 2, a telephone transceiver system 100 containing a receiver circuit in accordance with one embodiment of the present invention contains functional elements similar to those discussed above in connection with the system 10 of FIG. 1. Some important distinctions, however, are as follow. The voice activity detector (VAD) 122 provides two signals: a voice-operated transmission (VOX) control signal 123a to the transmitter circuitry 120, as discussed above; and a sidetone control signal 123b to the sidetone generator 124. Some form of audio signal conditioner 140 can also be used, as desired, to convert the incoming audio signal 135 into the audio signals 141a, 141b, 141c needed for the transmitter circuitry 120, VAD 122 and sidetone generator 124. For example, the audio signal conditioner 140 can provide for attenuation, or amplification or filtering, as needed, so as to provide these signals 141a, 141b, 141c at different magnitudes, as well as provide for isolation between them.

In accordance with the present invention, the VAD 122 monitors voice activity within the incoming audio signal 141b. When voice activity is present, the VOX control signal 123a causes the transmitter circuitry 120 to be enabled for providing the outgoing transmission signal 121. Also, when voice activity is present within the audio signal 141b, the sidetone control signal 123b generated by the VAD 122 causes the sidetone generator 124 to provide the appropriate sidetone signal 125. In the absence of voice activity within the audio signal 141b, these control signals 123a, 123b cause the transmitter circuitry 120 to be disabled, thereby preventing the transmission signal 121 from being generated, and the sidetone generator 124 to terminate or significantly attenuate generation of the sidetone signal 125. (These control signals 123a, 123b can be the same signal, or, alternatively, can be generated as separate signals with their own distinct characteristics, as desired, so as to provide the appropriate controls over the transmitter circuitry 120 and sidetone generator 124.)

The VAD 122, other than being capable of generating the two control signals 123a, 123b instead of a single control signal, can be conventional in design. For example, the VAD 122 should use a voice activity detector with the normal operating constraints. First, it is important that speech clarity not be compromised as a result of the controls over the transmitter circuitry 120, and that the quality of the voice sidetone generated not be compromised due to the control over the sidetone generator 124. Accordingly, this means that the VAD algorithm should be appropriately tuned so that the "attack" and "decay" periods of control ensure that the beginning of the speech is properly detected and not chopped off, and that the end of the speech is not truncated or otherwise terminated prematurely.

By way of example, one appropriate VAD algorithm would use voice versus-unvoiced energy in 14-bit linear pulse code modulation samples. This will ensure that the dynamically generated sidetone signal 125 based upon this VAD algorithm is correct. To accomplish this, the "attack" Ta and "decay" Td time constants should not be symmetric, and the attack time constant Ta should be less than the decay time constant Td. This will allow fast tracking of the speech rise times ("attacks") and a slower tracking of the speech fall times ("decays").

More specifically, such a VAD algorithm should track the average and standard deviation for the two first-order statistical procedures of the speech, i.e., the energy and rate of zero crossings. The energy p(n) is calculated over a 5 millisecond window of speech and updated at a 200 Hertz rate. The rate of zero crossings zc(n) is also calculated over a 5 millisecond window and updated at a 200 Hertz rate. Such an algorithm operates on a 5 millisecond speech packet in accordance with the GSM TDMA standard.

Various other modifications and alterations in the structure and method of operation of this invention will be apparent to those skilled in the art without departing from the scope and spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. An apparatus including a telephone receiver circuit with a sidetone signal generator controlled by voice activity detection, comprising:

a voice activity detection circuit configured to receive a first transmitter audio signal originating from a transmitter audio signal source and to detect voice activity within said first transmitter audio signal and in accordance therewith provide a first and second voice activity detection signals with first and second signal states, respectively, that indicate when said first transmitter audio signal voice activity has transcended a voice activity threshold;

a transmitter circuit, coupled to said voice activity detection circuit, configured to receive said first voice activity detection signal and a second transmitter audio signal which is related to said first transmitter audio signal and in accordance therewith provide a radio frequency transmission signal with first and second magnitudes when said first voice activity detection signal indicates that said first transmitter audio signal voice activity has transcended said voice activity threshold in first and second directions, respectively;

a sidetone signal generator circuit, coupled to said voice activity detection circuit, configured to receive said second voice activity detection signal and a third transmitter audio signal which is related to said first transmitter audio signal and in accordance therewith provide a sidetone signal with first and second magnitudes when said voice activity detection signal indicates that said first transmitter audio signal voice activity has transcended said voice activity threshold in said first and second directions, respectively; and a signal combining circuit, coupled to said sidetone signal generator circuit, configured to receive and combine said sidetone signal and a first receiver audio signal originating from a receiver audio signal source and in accordance therewith provide a second receiver audio signal containing an audio signal component which is related to said sidetone signal.

2. The apparatus of claim 1, wherein said signal combining circuit comprises a signal summing circuit.

3. The apparatus of claim 1, wherein said first and second sidetone signal magnitudes are substantially nonzero and zero, respectively.

4. The apparatus of claim 1, wherein said first sidetone signal magnitude is greater than said second sidetone signal magnitude.

5. The apparatus of claim 1, further comprising a receiver circuit, coupled to said signal combining circuit and containing said receiver audio signal source, configured to receive and process a radio frequency reception signal containing a received signal component which is related to said first receiver audio signal and in accordance therewith provide said first receiver audio signal.

6. The apparatus of claim 1, further comprising a transducer element as said transmitter audio signal source, coupled to said voice activity detection circuit, configured to convert sound to said first, an second and third transmitter audio signals.

7. The apparatus of claim 1, further comprising a transducer element, coupled to said signal combining circuit, configured to receive and convert said second receiver audio signal to sound.

* * * * *

UNITED STATES PATENT AND TRADEMARK OFFICE
CERTIFICATE OF CORRECTION

PATENT NO.     : 6,850,617 B1
DATED          : February 1, 2005
INVENTOR(S)    : David Lind Weigand It is certified that error appears in the above-identified patent and that said Letters Patent is hereby corrected as shown below:

Column 3,
Line 29, after "tion", please insert -- . --.

Column 4,
Line 18, delete "voice versus-unvoiced" and insert -- voiced-versus-unvoiced --.
Line 55, after "provide" and before "first", please delete "a".

Column 6,
Line 17, after "first," and before "second", please delete "an".

Signed and Sealed this

Thirty-first Day of May, 2005

JON W. DUDAS
*Director of the United States Patent and Trademark Office*